(12) United States Patent
Fukushima

(10) Patent No.: US 12,486,130 B2
(45) Date of Patent: Dec. 2, 2025

(54) IMAGE READING APPARATUS AND IMAGE FORMING APPARATUS INCLUDING THE SAME

(71) Applicant: CANON KABUSHIKI KAISHA, Tokyo (JP)

(72) Inventor: Takayuki Fukushima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 18/347,430

(22) Filed: Jul. 5, 2023

(65) Prior Publication Data

US 2024/0017945 A1    Jan. 18, 2024

(30) Foreign Application Priority Data

Jul. 13, 2022  (JP) .................................. 2022-112264
Apr. 19, 2023  (JP) .................................. 2023-068893

(51) Int. Cl.
*B65H 5/36*     (2006.01)
*B65H 5/06*     (2006.01)

(52) U.S. Cl.
CPC ................. *B65H 5/06* (2013.01); *B65H 5/36* (2013.01); *B65H 2301/4432* (2013.01); *B65H 2402/44* (2013.01); *B65H 2801/06* (2013.01)

(58) Field of Classification Search
CPC .......... B65H 2402/441; B65H 2601/11; B65H 2801/39; H04N 1/00909; H04N 1/00543
See application file for complete search history.

(56) References Cited

U.S. PATENT DOCUMENTS

| 7,379,700 B2 * | 5/2008 | Iwata ................... H04N 1/0058 |
| | | 399/125 |
| 11,689,675 B2 * | 6/2023 | Yamada ............. H04N 1/00543 |
| | | 358/475 |
| 2012/0170087 A1 * | 7/2012 | Nose .................. H04N 1/00543 |
| | | 358/498 |

FOREIGN PATENT DOCUMENTS

JP    2005194011 A    7/2005

\* cited by examiner

*Primary Examiner* — Howard J Sanders
(74) *Attorney, Agent, or Firm* — Canon U.S.A., Inc., IP Division

(57) ABSTRACT

An image reading apparatus includes a base unit, a conveyance roller to convey a sheet, a reading unit, an openable cover having a first contact portion, a guide member having a second contact portion, and an urging member. The guide member is rotatable between a first position where the reading unit is covered and a second position where the reading unit is exposed. The urging member urges the guide member in a direction from the first position toward the second position. During closing of the openable cover, the first contact portion presses the second contact portion and the guide member moves against an urging force of the urging member. A position of the guide member in a rotation direction in a state in which the openable cover is closed is determined by the first contact portion and the second contact portion coming into contact with each other.

9 Claims, 9 Drawing Sheets

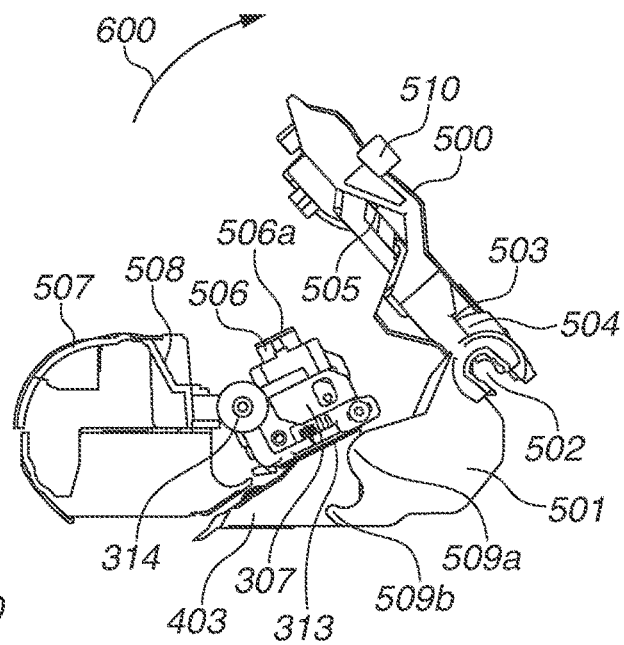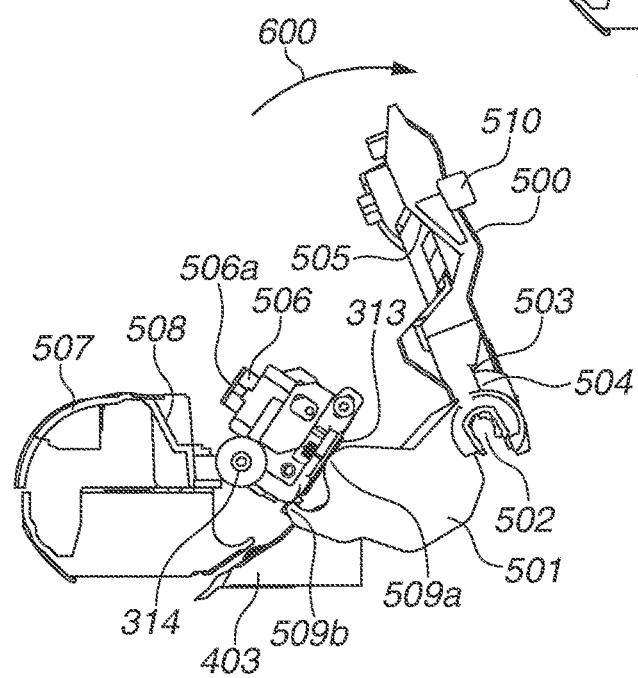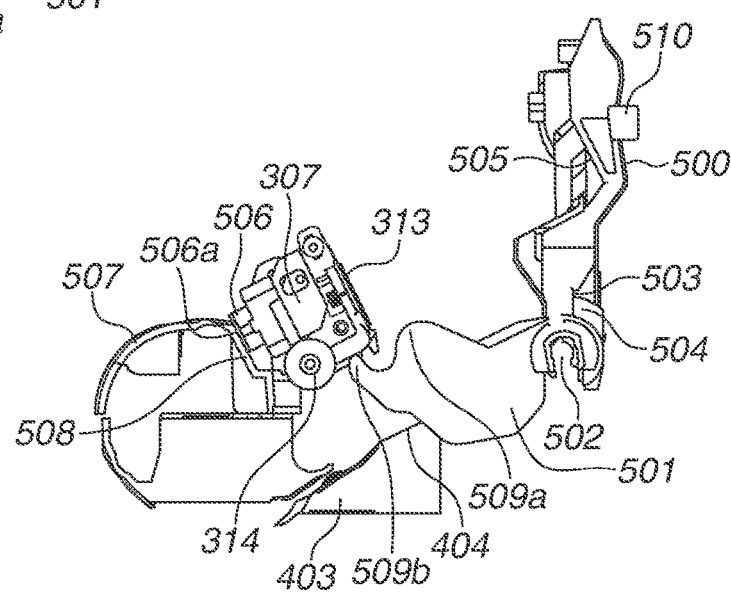

IMAGE READING APPARATUS AND IMAGE FORMING APPARATUS INCLUDING THE SAME

BACKGROUND

Field

The present disclosure relates to an image reading apparatus and an image forming apparatus including the same.

Description of the Related Art

Some conventional image reading apparatuses mounted on an image forming apparatus, such as a copy machine, have an auto document feeder (hereinbelow referred to as ADF) that conveys documents on a document tray one by one. Japanese Patent Application Laid-open No. 2005-194011 discusses a configuration in which an openable cover serving as an upper part of an image reading apparatus and a guide member forming a sheet conveyance path in an ADF are rotatably disposed to allow a glass surface of a reading unit to be exposed outside the image reading apparatus.

The configuration discussed in Japanese Patent Application Laid-open No. 2005-194011, however, has an issue that the openable cover and the guide member forming the sheet conveyance path are disposed to be rotatable independently of each other, and the size of a space of the sheet conveyance path through which a sheet passes sometimes varies. Depending on a position of the guide member, the space through which a sheet on the sheet conveyance path passes is narrow, which leads to a sheet conveyance failure.

SUMMARY

The present disclosure is directed to reduction of a sheet conveyance failure in an auto document feeder (ADF) in which an openable cover and a guide member are independently rotatable.

According to an aspect of the present disclosure, an image reading apparatus includes a base unit, a conveyance roller disposed to the base unit and configured to convey a sheet, a reading unit configured to read an image of the sheet conveyed by the conveyance roller, an openable cover including a first contact portion and a first guide for guiding the sheet conveyed by the conveyance roller, wherein the openable cover is configured to be supported by the base unit in an openable manner, a guide member including a second contact portion configured to come into contact with the first contact portion in a state in which the openable cover is closed, and a second guide that forms a conveyance path with the first guide, wherein the guide member is configured to be supported by the base unit to be rotatable between a first position in which the reading unit is covered and a second position in which the reading unit is exposed, and an urging member configured to urge the guide member in a direction from the first position toward the second position, wherein, during closing of the openable cover, the first contact portion presses the second contact portion and the guide member moves against an urging force of the urging member, and wherein a position of the guide member in a rotation direction in the state in which the openable cover is closed is determined by the first contact portion and the second contact portion coming into contact with each other.

Further features of the present disclosure will become apparent from the following description of exemplary embodiments with reference to the attached drawings.

BRIEF DESCRIPTION OF THE DRAWINGS

FIGS. 9A to 9C are diagrams illustrating a rotation movement of a reading unit.

DESCRIPTION OF THE EMBODIMENTS

Hereinafter, exemplary embodiments of the present disclosure will be described in detail with reference to the accompanying drawings. Configurations described in the following exemplary embodiments are representative examples, and the scope of the present disclosure is not necessarily limited to such specific configurations.

<Image Forming Apparatus>

Figure 1:
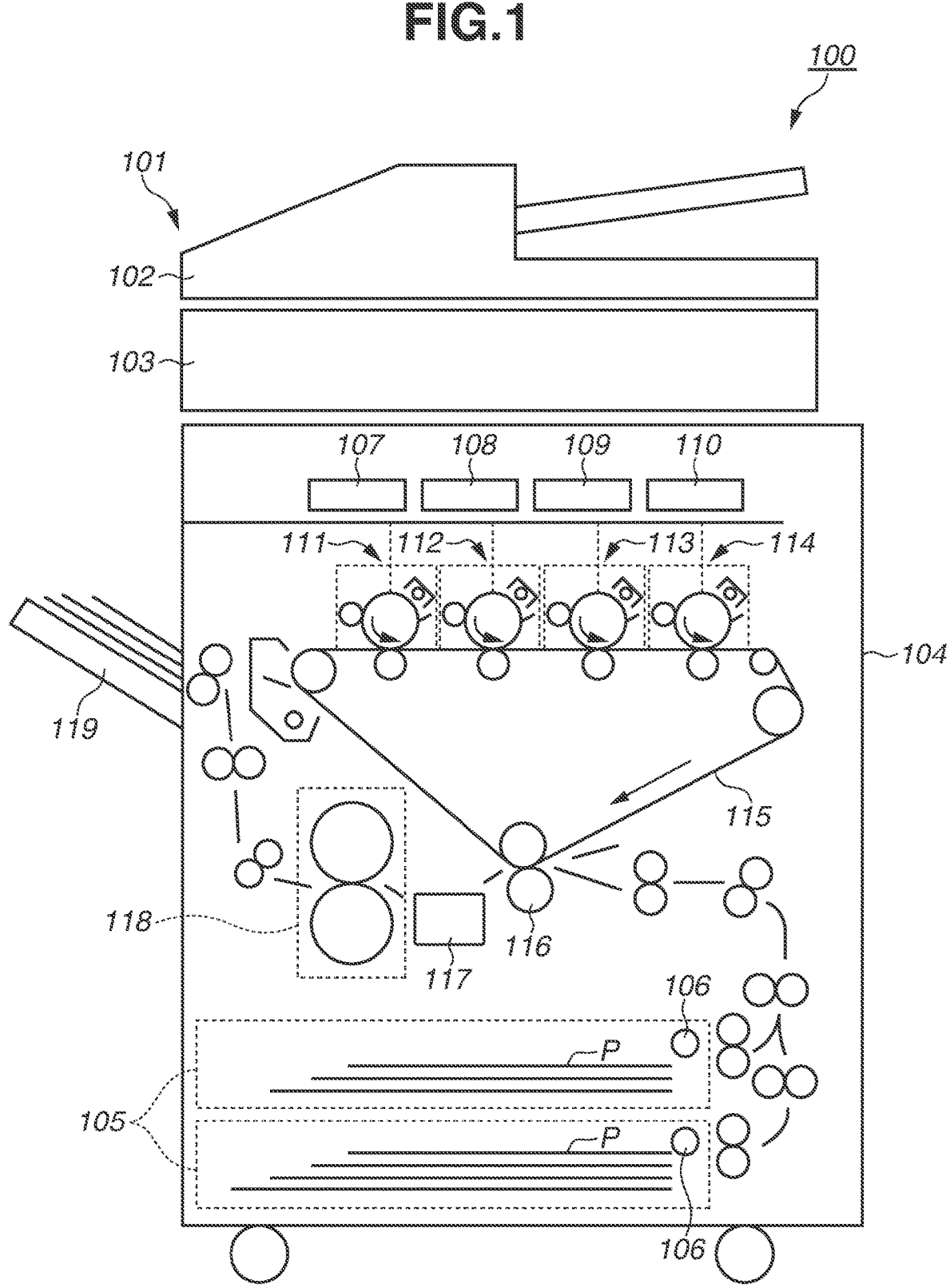
FIG. 1 is a diagram illustrating a section view of an image forming apparatus.

A description will be given of an image forming apparatus 100 according to a present exemplary embodiment with reference to FIG. 1. FIG. 1 is a schematic cross-section diagram illustrating the image forming apparatus 100 viewed from front.

As illustrated in FIG. 1, the image forming apparatus 100 includes an image forming apparatus main body 104 and an image reading apparatus 101 disposed above the image forming apparatus main body 104. The image forming apparatus 100 forms a toner image on a sheet P, based on image data read by the image reading apparatus 101 or an image signal transmitted from a host apparatus, such as a personal computer, connected to the image forming apparatus 100 in a manner capable of communicating with each other. The sheet P as a recording medium is a sheet material of, for example, a normal sheet, a plastic film, and fabric.

The image forming apparatus main body 104 houses laser scanners 107, 108, 109, and 110, image forming units 111, 112, 113, and 114, and a fixing unit 118. The laser scanners 107, 108, 109, and 110 corresponding to colors of yellow, magenta, cyan, and black, respectively, are an image forming part using an electrophotographic method. The laser scanners 107, 108, 109, and 110 emit laser light to respective photosensitive bodies each disposed to a corresponding one of the image forming units 111, 112, 113, and 114. The image forming units 111, 112, 113, and 114 are disposed along an intermediate transfer belt 115.

The image forming unit 111 forms a yellow toner image, and the yellow toner image is primarily transferred to the intermediate transfer belt 115. The image forming unit 112 forms a magenta toner image, and the magenta toner image is primarily transferred over the yellow toner image that has been transferred to the intermediate transfer belt 115. The image forming unit 113 forms a cyan toner image, and the cyan toner image is transferred over an overlaid image of the yellow toner image and the magenta toner image that have been transferred to the intermediate transfer belt 115. The image forming unit 114 forms a black toner image, and the black toner image is transferred over an overlaid image of the yellow toner image, the magenta toner image, and the cyan toner image that have been transferred to the intermediate transfer belt 115.

In the lower part of the image forming apparatus main body 104, sheet feeding cassettes 105 that are able to be pulled out to the front are disposed. The image forming apparatus 100 feeds a sheet P stored in the sheet feeding cassette 105 by a pickup roller 106. The sheet P fed by the pickup roller 106 is conveyed to a secondary transfer nip part where the intermediate transfer belt 115 and a secondary transfer unit 116 are in contact with each other. In the conveying of the sheet P, the image forming apparatus 100 conveys the sheet P in synchronization with the multiple overlaid toner image on the intermediate transfer belt 115. At the secondary transfer nip part, the multiple overlaid image on the intermediate transfer belt 115 is transferred to the sheet P under the action of a secondary transfer bias voltage applied to the secondary transfer unit 116.

The sheet P bearing the multiple overlaid toner image secondarily transferred at the secondary transfer unit 116 is conveyed to the fixing unit 118 by a conveyance belt 117. The multiple overlaid toner image is fixed on the sheet P received heat and pressure from the fixing unit 118, and after the fixing of the multiple overlaid toner image on the surface of the sheet P, the sheet P is discharged to a discharge tray 119.

While, in the present exemplary embodiment, the image forming apparatus 100 includes image forming means using the electrophotographic method, the image forming means is not limited to it. Other image forming means using, for example, an ink-jet method, can be used.

<Image Reading Apparatus>

Figure 2:
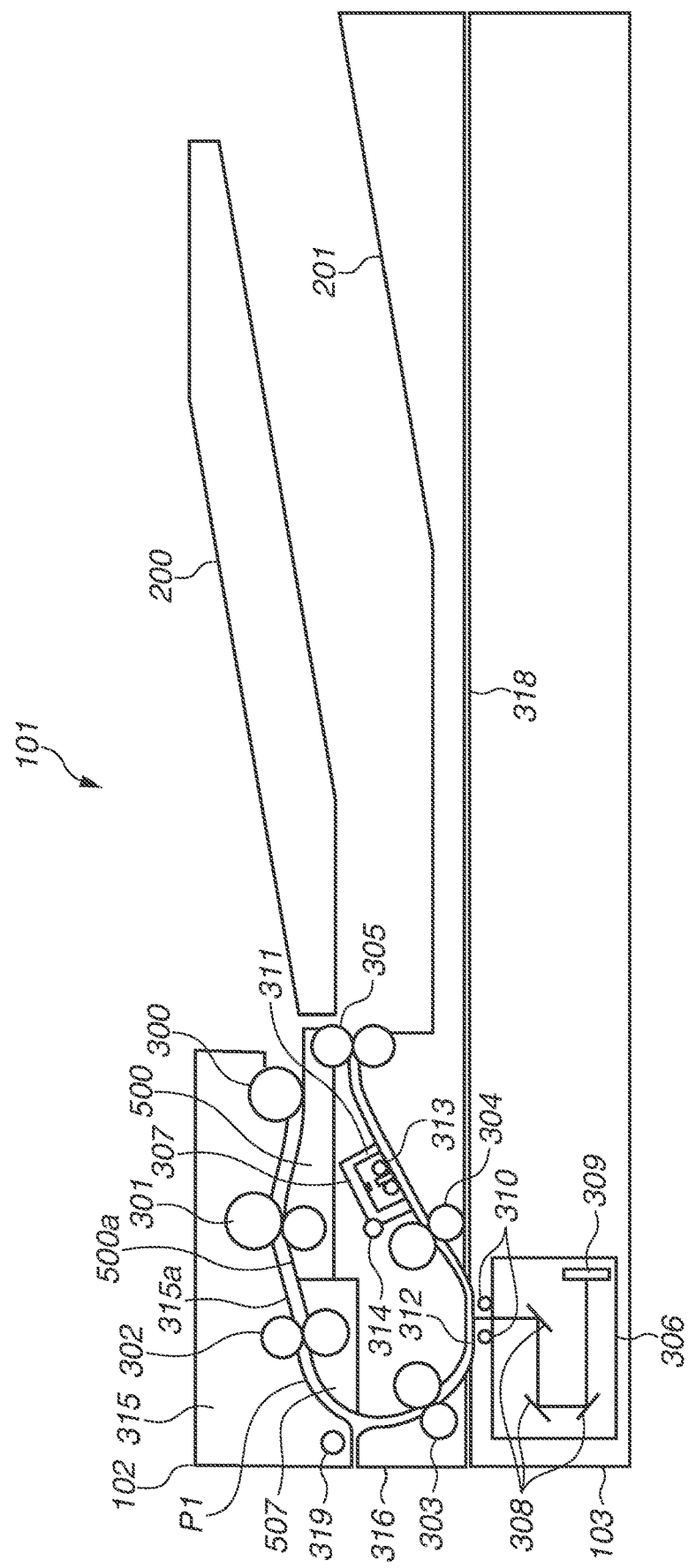
FIG. 2 is a diagram illustrating a section view of an image reading apparatus.
Figure 3:
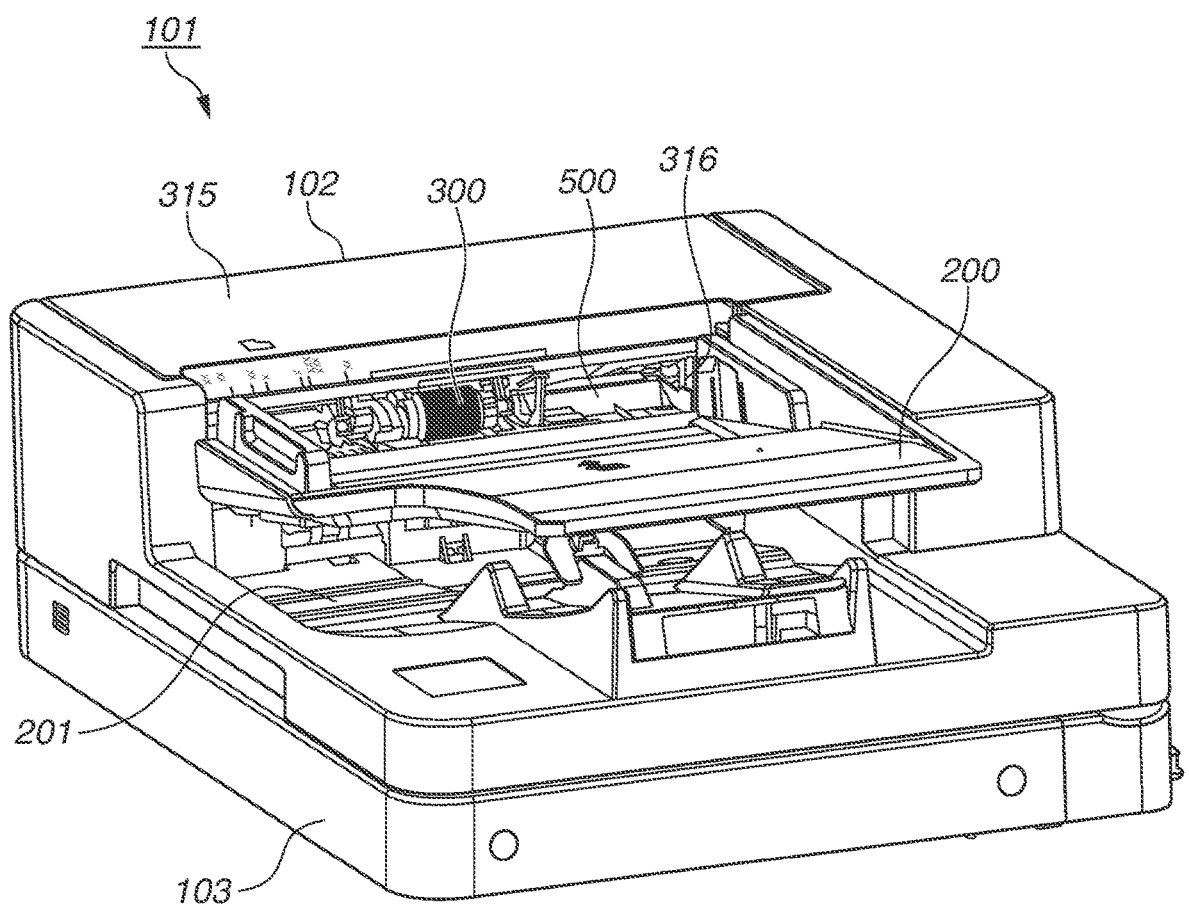
FIG. 3 is a diagram illustrating a perspective view of the image reading apparatus.

A description will be given of the image reading apparatus 101 with reference to FIGS. 2 and 3. FIG. 2 is a schematic section view of the image reading apparatus 101, and FIG. 3 is a perspective view of the image reading apparatus 101. The image reading apparatus 101 includes a reader 103 and an auto document feeder (ADF) 102 disposed above the reader 103. The ADF 102 is supported by a hinge (not-illustrated) disposed on the rear of the image reading apparatus 101 to be rotatable with respect to the reader 103. The image reading apparatus 101 is able to perform an operation to read image information from a document placed still on a document platen glass 318 of the reader 103 (fixed reading operation) and another operation to read image information from a sheet as a document during conveyance of the sheet by the ADF 102 (feeding-reading operation).

The reader 103 includes the document platen glass 318 on which a document is placed and a reading unit 306 that reads image information from a document placed on the document platen glass 318 while moving in a sub scanning direction (right-left direction in FIG. 2) below the document platen glass 318. The reader 103 further includes a first feeding-reading glass 312. The reading unit 306 reads image information by optically scanning a document conveyed by the ADF 102 via the first feeding-reading glass 312.

The reading unit 306 includes a sensor circuit board 309 on which a charge coupled device (CCD) sensor serving as a light receiving element is mounted, light sources 310 for irradiating a document with light, and a plurality of mirrors 308 for guiding light reflected on the document to an imaging plane of the light receiving element.

The ADF 102 includes a document tray 200, a discharge tray 201 disposed below the document tray 200, and a reading unit 307. In the ADF 102, a sheet feed roller 300, a separation roller pair 301, conveyance roller pairs 302, 303, and 304, and a discharge roller pair 305 are disposed along a document conveyance path P1. The document tray 200 is a placement unit on which a document is placed, and the discharge tray 201 is a discharge unit to which a sheet after image information reading is discharged. The conveyance roller pairs 303 and 304 and the discharge roller pair 305 are rotatably supported inside a base unit 316 of the ADF 102. The base unit 316 as a main body of the ADF 102 is configured with a plurality of conveyance guide members, a frame formed of a sheet metal, an exterior component (housing), and others. The document tray 200 is configured to be rotatable about a rotation shaft (not-illustrated) with respect to the base unit 316. When a user upwardly rotates the document tray 200, the user can easily obtain a document on the discharge tray 201.

The reading unit 307 includes a contact image sensor (hereinbelow referred to as CIS) 311 as a reading unit and a second feeding-reading glass 313. Via the second feeding-reading glass 313 as a transparent member that allows light from a document to pass through, the CIS 311 reads image information from a document being conveyed through the document conveyance path P1. The reading unit 307 is rotatably supported about a rotation shaft 314 with respect to the base unit 316 of the ADF 102. Details of a configuration of the reading unit 307 will be described below.

When the user issues a reading operation start instruction via an operation unit (not-illustrated) after placing a bundle of documents on the document tray 200, the sheet feed roller 300 as a sheet feed member feeds the documents from the top to the document conveyance path P1. The fed documents are separated one by one by the separation roller pair 301, and the separated document is passed to the conveyance roller pairs 302, 303, and 304, in this order, to be conveyed through the document conveyance path P1. The reading unit 306 reads image information from a first surface (front surface) of the document when the document passes the first feeding-reading glass 312 of the reader 103. Similarly, the reading unit 307 reads image information from a second surface (back surface) opposite to the first surface of the document when the document passes the second feeding-reading glass 313. The document after the image information reading is discharged by the discharge roller pair 305 to the outside of the ADF 102 and placed on the discharge tray 201. The first surface of the document refers to the top surface of the document placed on the document tray 200, and the second surface of the document refers to the bottom surface of the document placed on the document tray 200.

As illustrated in FIG. 3, the ADF 102 includes the openable cover 315 serving as the upper part of the image reading apparatus 101. The openable cover 315 as an openable member is rotatably supported (supported to be openable and closable) about a rotation shaft 319 with respect to the base unit 316 of the ADF 102. The openable cover 315 rotates about a rotation axis A (described below with reference to FIG. 4) extending in a width direction orthogonal to a sheet conveyance direction. The openable cover 315 includes an upper guide 315a that forms the document conveyance path P1 between the upper guide 315a and a lower guide 500a of a rotation guide member 500 described below. The upper guide 315a as a first guide is a guide surface that faces the top surface of the sheet fed by the sheet feed roller 300 to guide the sheet. The lower guide 500*a* as a second guide is a guide surface that faces the bottom surface of the sheet fed by the sheet feed roller 300 to guide the sheet. The openable cover 315 is held by a locking mechanism (not-illustrated) with respect to the base unit 316 at a close position (position illustrated in FIG. 3). When the user opening the openable cover 315 lifts upward the openable cover 315, the lock mechanism (not-illustrated) is released, and the openable cover 315 is able to be opened.

As illustrated in FIG. 3, in a state in which the openable cover 315 is closed, a part of the rotation guide member 500 is covered by the openable cover 315. Alternatively, an entire part of the rotation guide member 500 can be covered by the openable cover 315 in the state in which the openable cover 315 is closed. In the openable cover 315, the sheet feed roller 300 and one of the rollers of the separation roller pair 301 (the roller on upper side in the FIG. 3) and one of the rollers of the conveyance roller pair 302 (the roller on upper side in the FIG. 3) are disposed. Consequently, when the openable cover 315 is rotated upward from the close position to an open position, a part of the document conveyance path P1 is exposed and the rotation guide member 500 is exposed outside the ADF 102.

<Cleaning of Glass>

During a feeding-reading operation repeatedly performed by the image reading apparatus 101, a foreign substance including dust, such as paper powder, and glue and ink on documents may adhere to the first feeding-reading glass 312 and the second feeding-reading glass 313. If feeding-reading operation is performed in a state in which a foreign substance is adhered to an area of the first feeding-reading glass 312 corresponding to a reading area of the reading unit 306 or an area of the second feeding-reading glass 313 corresponding to a reading area of the reading unit 307, a stripe image is read at a position corresponding to the foreign substance which does not exist on an original document. This phenomenon is due to that a foreign substance adhering to the first feeding-reading glass 312 or the second feeding-reading glass 313 obstructs the path of light in reading by the reading unit 306 or 307 and casts a shadow (hereinbelow referred to as image stripe).

To eliminate the image stripe, cleaning the first feeding-reading glass 312 and the second feeding-reading glass 313 is effective at removing the foreign substance which is the cause of the image stripe. The user is able to clean the reading unit 306 of the reader 103 from above because the upward rotation of the ADF 102 from the reader 103 exposes the first feeding-reading glass 312.

On the other hand, the reading unit 307 is disposed inside the base unit 316. In the present exemplary embodiment, the reading unit 307 is disposed in an area below the rotation guide member 500 and inside the U-bend of the document conveyance path P1, as illustrated in FIG. 2. Thus, a configuration to expose the second feeding-reading glass 313 to the outside of the image reading apparatus 101 (means for allowing access to the second feeding-reading glass 313) is to be provided. In the present exemplary embodiment, the rotation guide member 500 and the reading unit 307 are configured to be independently rotatable with respect to the base unit 316, whereby the second feeding-reading glass 313 of the reading unit 307 is able to be exposed outside the ADF 102.

Figure 4:
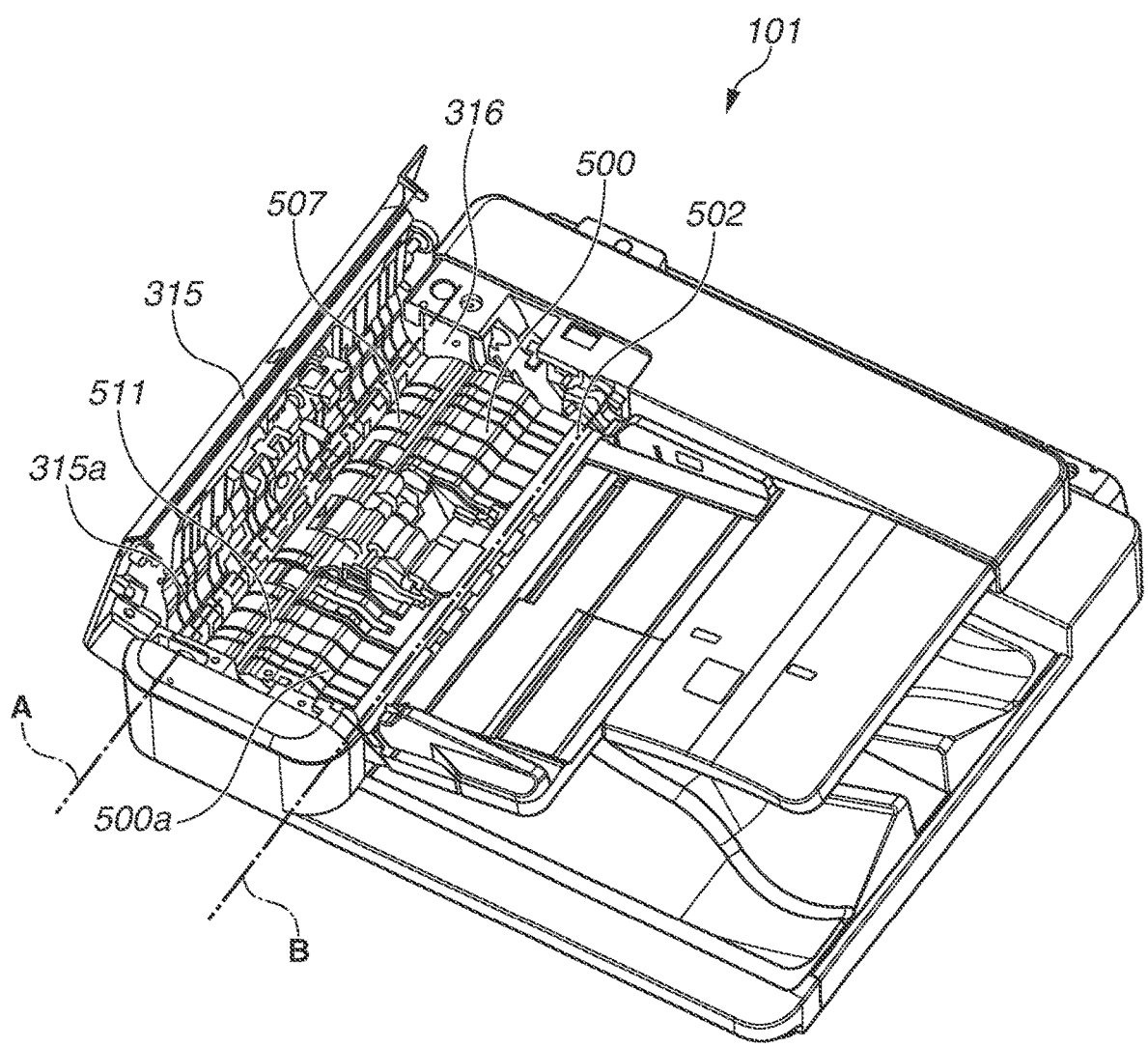
FIG. 4 is a diagram illustrating a perspective view of the image reading apparatus with an openable cover opened.
Figure 5:
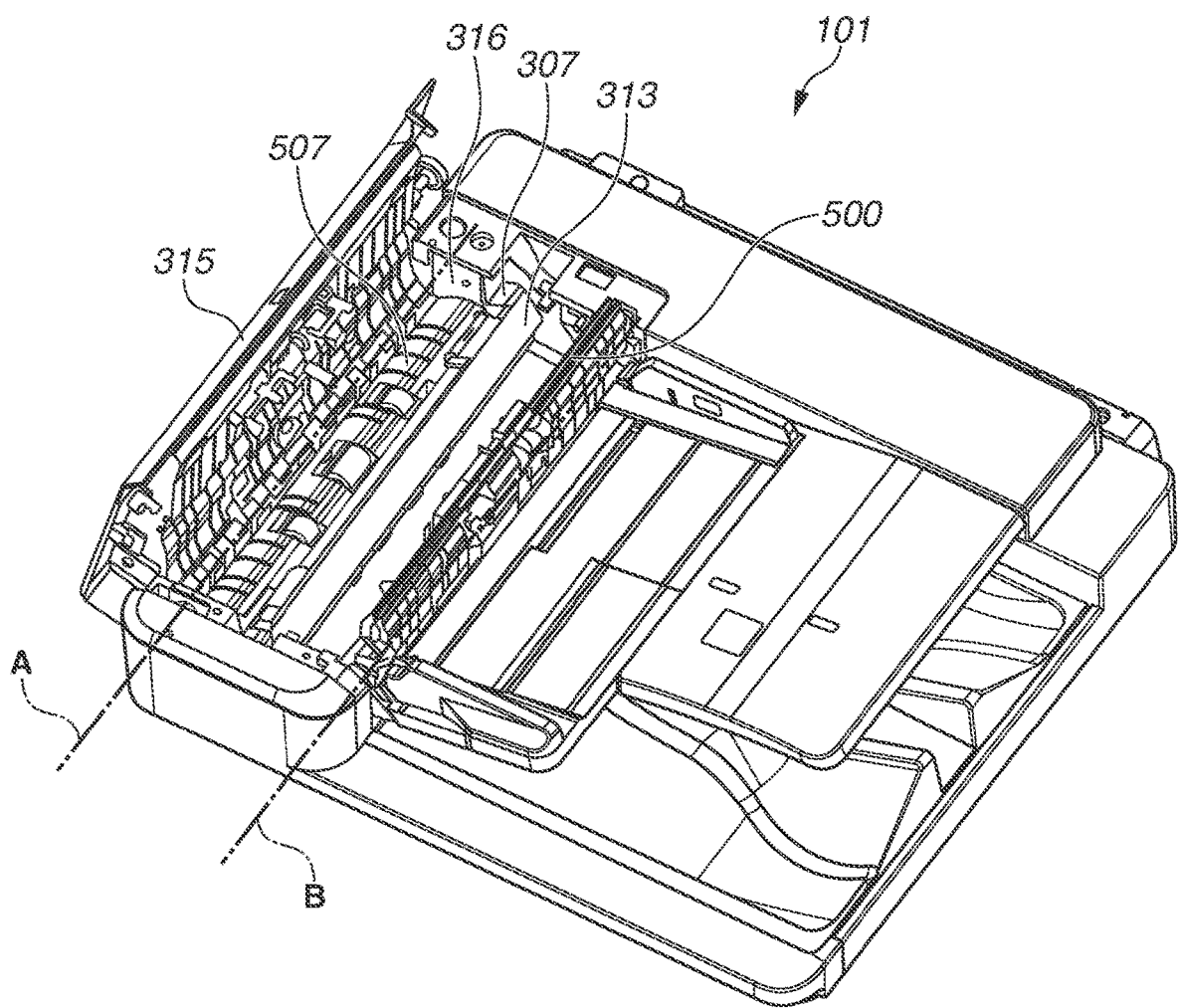
FIG. 5 is a diagram illustrating a perspective view of the image reading apparatus with the openable cover and a rotation guide member opened.

FIG. 4 is a diagram illustrating a perspective view of the image reading apparatus 101 with the openable cover 315 opened. FIG. 5 is a diagram illustrating a perspective view of the image reading apparatus 101 with the openable cover 315 and the rotation guide member 500 opened. As illustrated in FIG. 3, in a state in which the openable cover 315 is at the close position, the openable cover 315 covers above the rotation guide member 500. On the other hand, as illustrated in FIG. 4, in a state in which the openable cover 315 is at the open position, the rotation guide member 500 is exposed outside the image reading apparatus 101 viewed from above.

In the present exemplary embodiment, the rotation guide member 500 is rotatably supported by the base unit 316 of the ADF 102 about a rotation shaft 502. The rotation guide member 500 rotates about an axis line B extending in the width direction orthogonal to the sheet conveyance direction. The rotation guide member 500 is rotatable between a first position (FIG. 4) in which the rotation guide member 500 covers the reading unit 307 from above and a second position (FIG. 5) in which the reading unit 307 is exposed to the outside of the image reading apparatus 101 viewed from above. At the same time, a conveyance guide member 507 that guides a sheet subsequently from the lower guide 500*a* of the rotation guide member 500 is fixed to the base unit 316 of the ADF 102. As illustrated in FIG. 2, the conveyance guide member 507 is a downstream guide adjacent to a downstream end of the lower guide 500*a* and forms the document conveyance path P1 in a state facing the upper guide 315*a*.

The reading unit 307 is configured to rotate in conjunction with rotation of the rotation guide member 500 by an interlocked structure described below. As illustrated in FIG. 5, when the rotation guide member 500 is opened with the openable cover 315 opened, the reading unit 307 rotates and the second feeding-reading glass 313 is exposed outside the image reading apparatus 101 viewed from above.

<Configuration of Reading Unit>

Figure 6:
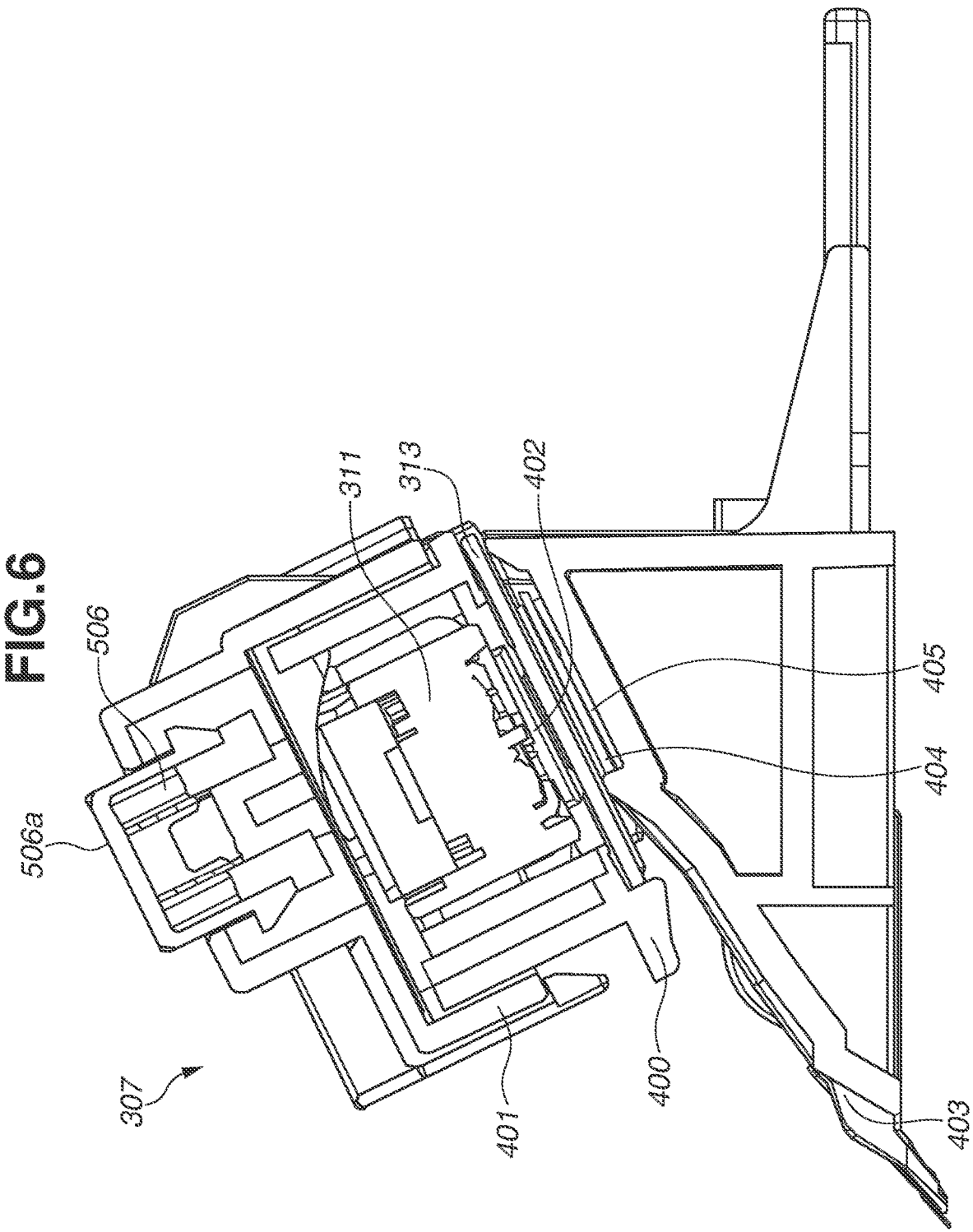
FIG. 6 is a diagram illustrating a section view of a reading unit and a read guide member.

The configuration of the reading unit 307 will be described with reference to FIG. 6. FIG. 6 is a diagram illustrating a section view of the reading unit 307 and a reading guide member 403. The reading unit 307 houses the CIS 311 with a first casing member 400 and a second casing member 401. An urging member 506 including a spring having elasticity is disposed above the second casing member 401. An opening 402 is formed in the surface of the first casing member 400 facing the document conveyance path P1 to read image information of a conveyed sheet, and the second feeding-reading glass 313 is attached to the first casing member to cover the opening 402.

At a position facing the second feeding-reading glass 313, the reading guide member 403 is disposed. The reading guide member 403 fixed to the base unit 316 is a member facing the second feeding-reading glass 313 and guides a sheet. More specifically, the reading guide member 403 forms a part of the document conveyance path P1 together with the second feeding-reading glass 313. A white sheet 405 and a cover glass 404 are disposed to the reading guide member 403. The white sheet 405 is a white reference member that is used for a shading correction of the CIS 311 before reading of image information by the reading unit 307. The cover glass 404 prevents the surface of the white sheet 405 from being scratched.

<Positioning of Rotation Guide>

A description will be given of a positioning configuration of the rotation guide member 500 with reference to FIGS. 7 and 8.

Figure 7:
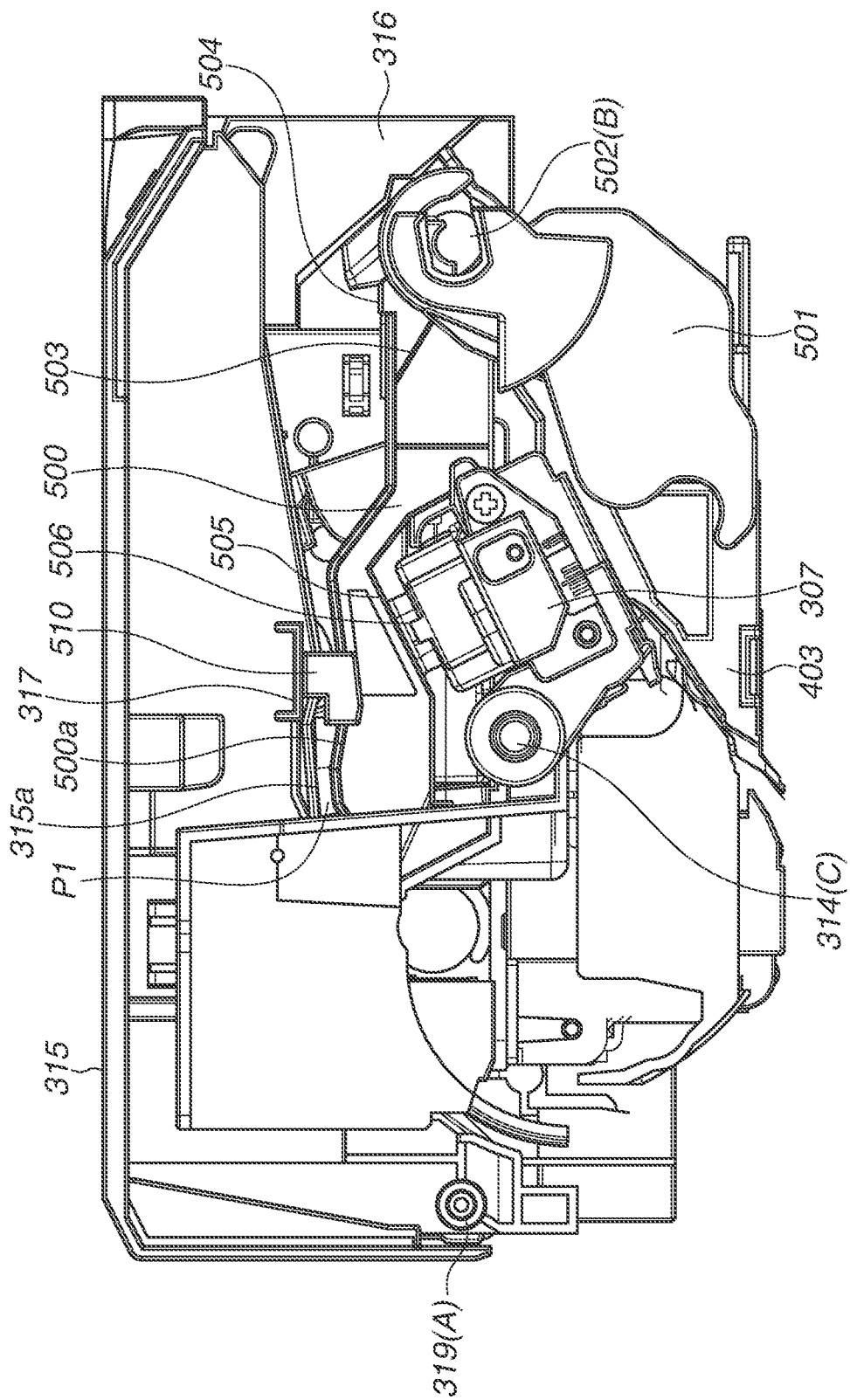
FIG. 7 is a diagram illustrating a side view of an auto document feeder (ADF) in a state with the openable cover and the rotation guide member closed.

FIG. 7 is a diagram illustrating a side view of the ADF 102 in a state in which the openable cover 315 and the rotation guide member 500 are closed with respect to the base unit 316. An exterior of the ADF 102 is omitted in FIG. 7 for explanation's sake. FIG. 8 is a diagram illustrating a state in which the openable cover 315 is opened with respect to the base unit 316.

As described above, the openable cover 315 is rotatably attached about the rotation shaft 319 with respect to the base unit 316, and the rotation guide member 500 is rotatably attached about the rotation shaft 502 with respect to the base unit 316. The reading unit 307 is rotatably attached about a rotation shaft 314 (axis line C) to be rotatable between a position in which the reading unit 307 reads an image of a sheet (third position) and a position in which the second feeding-reading glass 313 is exposed outside the image reading apparatus 101 (fourth position). The reading guide member 403 facing the reading unit 307 and forming the document conveyance path P1 is fixed to the base unit 316. As illustrated in FIG. 7, in the state in which the openable cover 315 and the rotation guide member 500 are closed with respect to the base unit 316, a pressing part 505 disposed to the rotation guide member 500 presses a contact surface 506a (see FIG. 6) of the urging member 506 from above. In the above described state, the second feeding-reading glass 313 of the reading unit 307 and a rib (not-illustrated) disposed outside a sheet conveyance area in a width direction of the reading guide member 403 come into contact with each other. Thus, a space (gap) through which a sheet passes is formed between the second feeding-reading glass 313 and the reading guide member 403.

Meanwhile, the rotation guide member 500 is urged upward by a force applied from the urging member 506. In the present exemplary embodiment, the rotation guide member 500 comes into contact with the openable cover 315 at the close position, which regulates rotation of the rotation guide member 500. More specifically, the openable cover 315 includes a regulating surface 317 (first contact portion), and the rotation guide member 500 includes an abutting part 510 (second contact portion) at a position corresponding to the regulating surface 317. The regulating surface 317 and the abutting part 510 are disposed at positions outside the sheet conveyance area, where a sheet passes, in the document conveyance path P1 in the width direction. The regulating surface 317 has a flat surface having the length in the sheet conveyance direction, and the abutting part 510 has a flat surface having the length in the width direction. In FIG. 7, while the regulating surface 317 and the abutting part 510 disposed on the front side with respect to the document conveyance path P1 are illustrated, another regulating surface 317 (third contact portion) and another abutting part 510 (fourth contact portion) are also disposed on the rear side with respect to the document conveyance path P1. In other words, the regulating surface 317 and the abutting part 510 are disposed both sides (one side and the other side) with respect to the sheet conveyance area in the width direction.

When the openable cover 315 moves from the open position to the close position, the regulating surface 317 comes into contact with the abutting part 510, and an upward movement of the rotation guide member 500 is regulated. In other words, the position of the rotation guide member 500 being urged by the urging member 506 from below in a rotation direction is determined by the regulating surface 317 of the openable cover 315 and the abutting part 510 of the rotation guide member 500 coming into contact with each other. With the above described configuration, the rotation guide member 500 receives a rotation force in a direction toward the openable cover 315 by the urging member 506, and a state in which the regulating surface 317 and the abutting part 510 are in contact with each other is maintained. Consequently, the space through which a sheet passes between the upper guide 315a of the openable cover 315 and the lower guide 500a of the rotation guide member 500 is accurately formed. Further, the reading unit 307 also receives a rotation force in a direction toward the reading guide member 403 by the urging member 506, a space through which a sheet passes between the second feeding-reading glass 313 and the reading guide member 403 is accurately formed.

While, in the present exemplary embodiment, the regulating surface 317 and the abutting part 510 are flat, the forms of the regulating surface 317 and the abutting part 510 are not limited to it. For example, in a case where one of the regulating surface 317 or the abutting part 510 has a curved surface, the regulating surface 317 and the abutting part 510 smoothly come into contact with each other when the openable cover 315 is closed.

Figure 8:
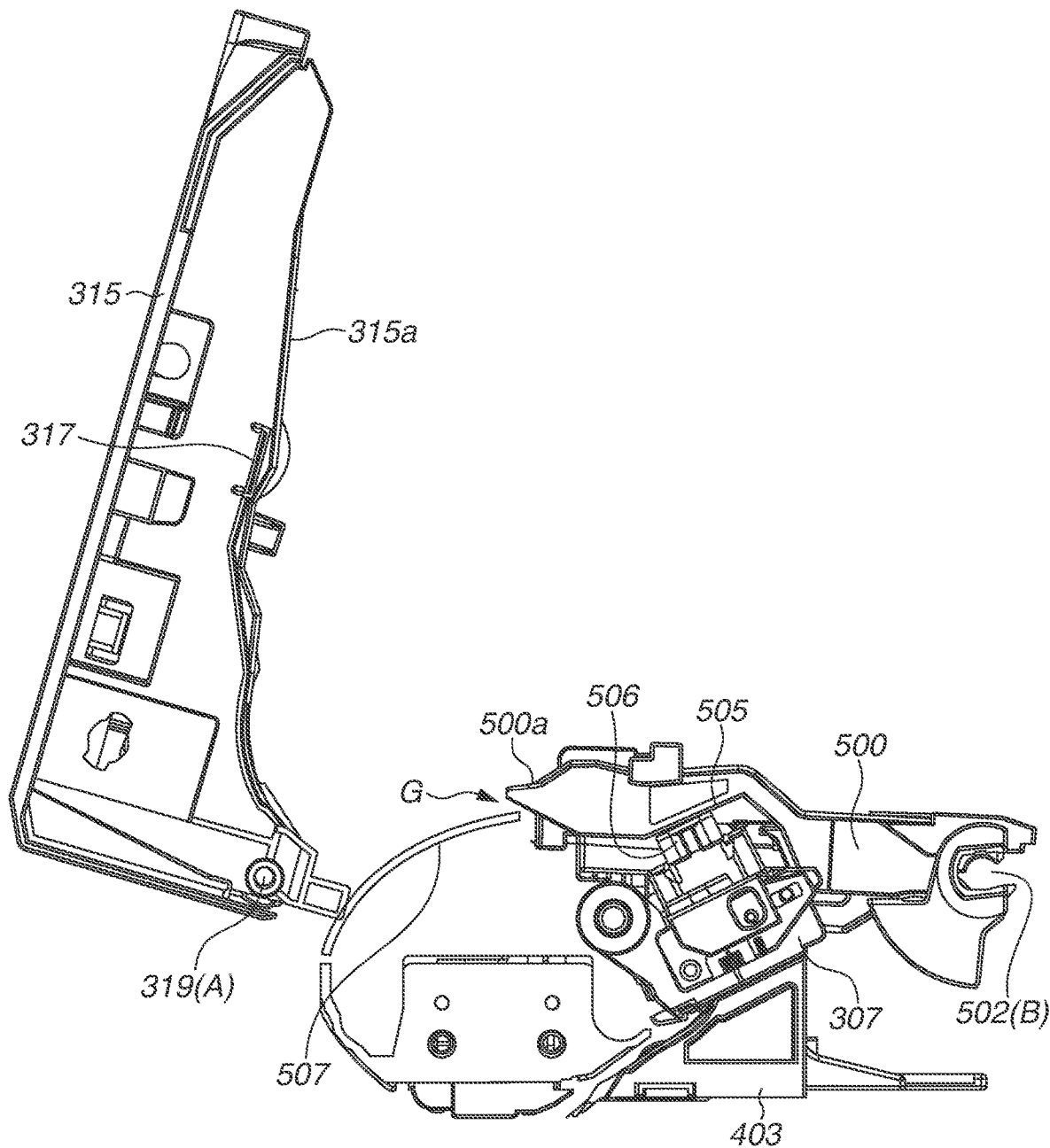
FIG. 8 is a diagram illustrating a side view of the rotation guide member with the openable cover opened.

In the state in which the openable cover 315 is opened as illustrated in FIG. 8, the regulating surface 317 is separated from the abutting part 510. Consequently, the rotation guide member 500 pressed by the urging member 506 upwardly rotates, and a gap G is formed between an upstream end of the conveyance guide member 507 and a downstream end of the lower guide 500a. The user can place a finger in the gap G and rotate the rotation guide member 500. On a downstream end of the rotation guide member 500, a mark 511 indicating an operation part where the user operates the rotation guide member 500 with a finger is disposed (see FIG. 4). In the present exemplary embodiment, the mark 511 is a blue colored sticker member stuck on a concave part formed in the downstream end of the lower guide 500a.

In the state in which the openable cover 315 is opened, the regulating surface 317 and the abutting part 510 are separate from each other. During closing of the openable cover 315 from the opened state, the regulating surface 317 comes into contact with the abutting part 510. Then, pressing of the abutting part 510 by the regulating surface 317 causes the rotation guide member 500 to move against the urging force of the urging member 506. More specifically, during closing of the openable cover 315 from the opened state, the rotation guide member 500 is pressed by the openable cover 315 and rotates downward by the gap G. Alternatively, the configuration can include a link mechanism with which, even in the state in which the openable cover 315 is opened, the regulating surface 317 and the abutting part 510 are maintained to be in contact with each other.

<Rotation of Reading Unit>

A description will be given of an operation in rotation of the reading unit 307, with reference to FIGS. 9A to 9C. In the present exemplary embodiment, the reading unit 307 rotates in conjunction with rotation of the rotation guide member 500 by an arm member 501 serving as an interlocking member. FIG. 9A is a diagram illustrating a state before the arm member 501 comes into contact with the reading unit 307. FIG. 9B is a diagram illustrating a state in which the arm member 501 is in contact with the reading unit 307 and the reading unit 307 is in rotational movement.

FIG. 9C is a diagram illustrating a state in which the reading unit 307 has rotated and the second feeding-reading glass 313 is exposed outside the image reading apparatus 101.

The arm member 501 is disposed to the rotation shaft 502 of the rotation guide member 500. The arm member 501 having the length vertical to the axis line B has two projecting parts 509a and 509b. The projecting part 509a is formed at a position closer to the rotation shaft 502 than the projecting part 509b. As illustrated in FIGS. 9A to 9C, a contact part 503 is disposed to the rotation guide member 500, and a contacted part 504 is disposed to the arm member 501 at a position corresponding to the contact part 503. In rotation of the rotation guide member 500 from the closed state (the state illustrated in FIG. 8) in a direction of an arrow 600, the contact part 503 comes into contact with the contacted part 504 when the rotation guide member 500 rotates by a predetermined angle. The contact part 503 coming into contact with the contacted part 504 causes the arm member 501 to rotate in the same direction as the rotation direction of the rotation guide member 500. More specifically, the arm member 501 can rotate in the same direction as the rotation direction of the rotation guide member 500 about the rotation shaft 502 together with rotation of the rotation guide member 500.

As illustrated in FIG. 9A, when the rotation guide member 500 rotates in the direction of the arrow 600 and the contact part 503 comes into contact with the contacted part 504, the arm member 501 starts rotating also in the direction of the arrow 600. The rotation of the arm member 501 causes the projecting part 509a formed in the arm member 501 to come into contact with the second feeding-reading glass 313 of the reading unit 307. Then, the reading unit 307 rotates about the rotation shaft 314 in such a manner that the reading unit 307 is lifted by the projecting part 509a of the arm member 501. The rotation guide member 500 and the arm member 501 further rotate as illustrated in FIG. 9B, the projecting part 509b formed in the arm member 501 comes into contact with a side surface of the reading unit 307. When the rotation guide member 500 rotates to a position where the rotation guide member 500 is completely opened as illustrated in FIG. 9C, the reading unit 307 is supported by the projecting part 509b of the arm member 501, and the second feeding-reading glass 313 is in an upward facing position. In this state, the contact surface 506a of the urging member 506 disposed to the reading unit 307 comes into contact with a support surface 508 disposed to the conveyance guide member 507 which is a part of the base unit 316. With the above described configuration, even in a case where the reading unit 307 rotates quickly, the urging member 506 absorbs the shock, which reduces breakage of the reading unit 307.

As described above, the arm member 501 rotates together with rotation of the rotation guide member 500, and the projecting parts 509a and 509b disposed to the arm member 501 come into contact with the reading unit 307, whereby the reading unit 307 rotates. With the above described configuration, when the openable cover 315 and the rotation guide member 500 are opened, the second feeding-reading glass 313 of the reading unit 307 is in an exposed state when viewed from above of the image reading apparatus 101, as illustrated in FIG. 5. Thus, the user can clean the second feeding-reading glass 313 of the reading unit 307.

As described above, in the present exemplary embodiment, the position of the rotation guide member 500 in the rotation direction is determined by the regulating surface 317 disposed to the openable cover 315 and the abutting part 510 disposed to the rotation guide member 500 coming into contact with each other. Thus, the space through which a sheet passes between the upper guide 315a of the openable cover 315 and the lower guide 500a of the rotation guide member 500 is accurately secured. Further, in the present exemplary embodiment, the regulating surface 317 and the abutting part 510 are disposed at positions, in the width direction, outside the sheet conveyance area in the document conveyance path P1 where a sheet passes. With this configuration, the regulating surface 317 and the abutting part 510 do not come in contact with a sheet in the document conveyance path P1, which leads to reduction of a sheet jam. Further, since the regulating surface 317 and the abutting part 510 are disposed on the both sides of the sheet conveyance area, the position of the rotation guide member 500 in the rotation direction is stable.

In the present exemplary embodiment, the urging member 506 urges the reading unit 307 toward the reading guide member 403 from above. With this configuration, the space through which a sheet passes between the second feeding-reading glass 313 and the reading guide member 403 is stably formed, which leads to reduction of a sheet conveyance failure.

In the present exemplary embodiment, the ADF 102 includes the arm member 501 that rotates the reading unit 307 in conjunction with the rotation of the rotation guide member 500. Thus, the user operation when the second feeding-reading glass 313 is to be cleaned can be simplified.

In the state in which the openable cover 315 is opened, the rotation guide member 500 is urged upward by the urging member 506, and the gap G is formed between the upstream end of the conveyance guide member 507 and the downstream end of the lower guide 500a. Thus, the user is able to place a finger in the gap G to rotate the rotation guide member 500.

According to the present disclosure, occurrence of a sheet conveyance failure can be reduced in an ADF in which an openable member and a guide member are independently rotatable.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-112264, filed Jul. 13, 2022, and No. 2023-068893, filed Apr. 19, 2023, which are hereby incorporated by reference herein in their entirety.

What is claimed is:
1. An image reading apparatus comprising:
a base unit;
a conveyance roller disposed to the base unit and configured to convey a sheet;
a reading unit configured to read an image of the sheet conveyed by the conveyance roller;
an openable cover including a first contact portion and a first guide for guiding the sheet conveyed by the conveyance roller, wherein the openable cover is configured to be supported by the base unit in an openable manner;
a guide member including a second contact portion configured to come into contact with the first contact portion in a state in which the openable cover is closed, and a second guide that forms a conveyance path with the first guide, wherein the guide member is configured to be supported by the base unit to be rotatable between a first position in which the reading unit is covered and a second position in which the reading unit is exposed; and
an urging member configured to urge the guide member in a direction from the first position toward the second position,
wherein, during closing of the openable cover, the first contact portion presses the second contact portion and the guide member moves against an urging force of the urging member, wherein a position of the guide member in a rotation direction in the state in which the openable cover is closed is determined by the first contact portion and the second contact portion coming into contact with each other, and wherein the first contact portion and the second contact portion are disposed at positions outside a conveyance area where the sheet passes, in a width direction orthogonal to a sheet conveyance direction.

2. The image reading apparatus according to claim 1, wherein the reading unit includes a transparent member for transmitting light from the sheet and is rotatable between a third position where the reading unit reads the image of the sheet being conveyed through the conveyance path and a fourth position where the transparent member is exposed when viewed from above, wherein the base unit includes a facing member that faces the transparent member in a state in which the reading unit is at the third position, and wherein the urging member urges the reading unit toward the facing member in a state in which the guide member is at the first position.

3. The image reading apparatus according to claim 2, wherein the urging member comes into contact with the guide member when the reading unit is at the third position, and comes into contact with the base unit when the reading unit is at the fourth position.

4. The image reading apparatus according to claim 2, further comprising an interlocking member configured to move the reading unit from the third position to the fourth position in conjunction with movement of the guide member from the first position to the second position.

5. The image reading apparatus according to claim 1, wherein the base unit includes a downstream guide adjacent to a downstream end of the second guide in a sheet conveyance direction, and wherein, in a state in which the openable cover is opened, a gap is formed between the downstream end of the second guide and an upstream end of the downstream guide by the guide member being urged by the urging member.

6. The image reading apparatus according to claim 5, wherein the guide member includes, at the downstream end of the second guide, an operation part with which the guide member is rotated from the first position to the second position.

7. The image reading apparatus according to claim 1, wherein the first contact portion and the second contact portion are disposed at positions on one side with respect to the conveyance area in the width direction, wherein the openable cover includes a third contact portion disposed at a position on another side with respect to the conveyance area in the width direction, and wherein the guide member includes a fourth contact portion that is disposed at the position on the another side with respect to the conveyance area in the width direction and comes into contact with the third contact portion in a state in which the first guide and the second guide form the conveyance path.

8. The image reading apparatus according to claim 1, wherein the first contact portion and the second contact portion are flat.

9. An image forming apparatus comprising:
the image reading apparatus according to claim 1; and
an image forming unit configured to form, based on an image read by the image reading apparatus, the image on a recording medium.

* * * * *